US010003916B2

(12) United States Patent
Chaise et al.

(10) Patent No.: US 10,003,916 B2
(45) Date of Patent: Jun. 19, 2018

(54) METHOD AND SYSTEM FOR DETERMINING A MEANS OF COMMUNICATION BETWEEN MOBILE ELECTRONIC DEVICES

(71) Applicants: Keith Chaise, York, SC (US); Eden Chaise, York, SC (US)

(72) Inventors: Keith Chaise, York, SC (US); Eden Chaise, York, SC (US)

( * ) Notice: Subject to any disclaimer, the term of this patent is extended or adjusted under 35 U.S.C. 154(b) by 0 days. days.

(21) Appl. No.: 15/289,912

(22) Filed: Oct. 10, 2016

(65) Prior Publication Data

US 2017/0118589 A1   Apr. 27, 2017

Related U.S. Application Data

(60) Provisional application No. 62/238,750, filed on Oct. 8, 2015.

(51) Int. Cl.
*H04W 4/02*   (2018.01)
*H04M 3/42*   (2006.01)
*H04W 4/16*   (2009.01)

(52) U.S. Cl.
CPC ......... *H04W 4/02* (2013.01); *H04M 3/42059* (2013.01); *H04W 4/16* (2013.01)

(58) Field of Classification Search
CPC .... H04M 1/57; H04M 1/575; H04M 1/72519; H04M 2207/18; H04M 3/42042
See application file for complete search history.

(56) References Cited

U.S. PATENT DOCUMENTS

| | | | |
|---|---|---|---|
| 7,310,534 B2 | 12/2007 | Northcutt | |
| 8,504,089 B2 | 8/2013 | Stewart | |
| 8,571,572 B2 | 10/2013 | Han | |
| 2008/0305815 A1* | 12/2008 | McDonough | H04L 51/38 455/466 |
| 2009/0005018 A1* | 1/2009 | Forstall | H04M 3/42348 455/414.1 |
| 2009/0005981 A1* | 1/2009 | Forstall | G01C 21/20 701/431 |
| 2009/0181702 A1* | 7/2009 | Vargas | H04L 51/36 455/466 |
| 2010/0075638 A1* | 3/2010 | Carlson | H04L 51/14 455/412.1 |

(Continued)

*Primary Examiner* — Sharad Rampuria
(74) *Attorney, Agent, or Firm* — US IP Services, P.C.; Timothy Marc Shropshire; Eric Brandon Lovell

(57) ABSTRACT

A mobile application for most appropriate means of communications enables the user to locate a contact and determine the most appropriate way to reach the contact. The user may populate the user's contact list with information such as the names of contacts, their cellphone numbers, and their e-mail addresses. When preparing to communicate with someone on the contact list, the user causes a query to be sent to the contact's electronic device, which in turn sends a GPS query to acquire location information and sends it to the user. The user's application uses the location information to determine the nature of the contact's location and displays an icon corresponding to the type of location, such as a school, a library, a vehicle, or a restaurant. The user may select a communication method which is appropriate for the type of location or pursue some other course of action.

10 Claims, 1 Drawing Sheet

(56) References Cited

U.S. PATENT DOCUMENTS

| | | | |
|---|---|---|---|
| 2010/0229082 A1* | 9/2010 | Karmarkar | H04M 1/72547 715/205 |
| 2011/0136516 A1* | 6/2011 | Ellis | H04W 4/14 455/458 |
| 2015/0009117 A1* | 1/2015 | Peters | G06F 3/013 345/156 |
| 2016/0012465 A1* | 1/2016 | Sharp | G06Q 20/18 705/14.17 |

* cited by examiner

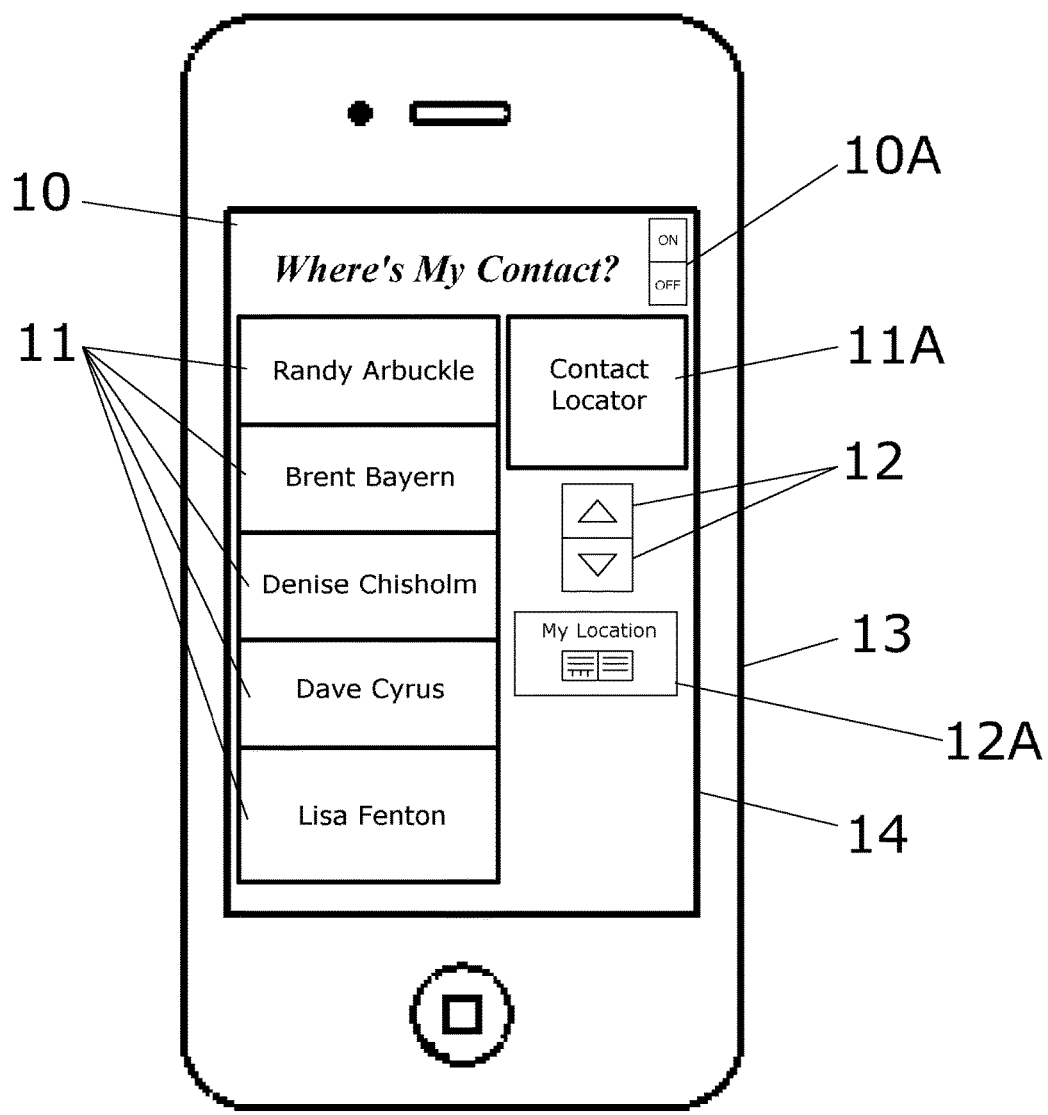

METHOD AND SYSTEM FOR DETERMINING A MEANS OF COMMUNICATION BETWEEN MOBILE ELECTRONIC DEVICES

CROSS-REFERENCE TO RELATED APPLICATIONS

This Application claims the benefit of U.S. Provisional Application No. 62/238,750, filed Oct. 8, 2015, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to mobile applications and in particular to a mobile application for most appropriate means of communication. Nearly everyone who owns a cellular telephone has had the unpleasant experience of hearing it ring at an inconvenient time. In certain circumstances, repeated calls can be disruptive even if they aren't answered. Unfortunately, many users need to be capable of being contacted in the event of an emergency and cannot shut off or silence their cellphones. Fortunately, most cellphones include a Global Positioning System (GPS) function and it is the key to a solution. A mobile application for most appropriate means of communication, which automatically initiates a GPS query and uses the location information to advise the user regarding the type of location occupied by the contact, would resolve this problem.

SUMMARY OF THE INVENTION

Accordingly, the invention is directed to a mobile application for most appropriate means of communications. The user may populate the user's contact list with information such as the names of contacts, their cellphone numbers, and their e-mail addresses. When preparing to communicate with someone on the contact list, the user causes a query to be sent to the contact's electronic device, which in turn sends a GPS query to acquire location information and sends it to the user. The user's application uses the location information to determine the nature of the contact's location and displays an icon corresponding to the type of location, such as a school, a library, a vehicle, or a restaurant. The user may select a communication method which is appropriate for the type of location or pursue some other course of action.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWING

The accompanying drawing is included to provide a further understanding of the invention and is incorporated into and constitutes a part of the specification. It illustrates one embodiment of the invention and, together with the description, serves to explain the principles of the invention.

The FIGURE shows a front view of an electronic device with the first exemplary embodiment installed, displaying the homepage 10, the on/off button 10A, the contact buttons 11, the contact locator button 11A, the scrolling buttons 12, the My Location button 12A, the electronic device 13, and the visual display 14.

DETAILED DESCRIPTION OF THE INVENTION

Referring now to the invention in more detail, the invention is directed to a mobile application for most appropriate means of communication.

It is to be understood that the term "contact" is used herein to refer to all personal contacts of the user, and may include friends, a spouse, relatives, the user's employer, business associates, neighbors, the user's personal physician or other professionals, college classmates, a babysitter, a personal trainer, and others who may be contacted by the user.

The first exemplary embodiment is comprised of a mobile application which may be downloaded and installed on the user's smartphone, tablet, or other electronic device 13. When activated, the application displays a homepage 10 on the visual display 14 of the user's electronic device 13. The application provides an on/off button 10A, a plurality of contact buttons 11, a contact locator button 11A, and scrolling buttons 12 to enable the user to scroll up and down through an alphabetized list of contact buttons 11.

The application further provides a My Location button 12A below the scrolling buttons 12, enabling the user to select an appropriate icon to indicate the user's activities, such as a driver icon indicating that SMS text messages may be received, or a passenger icon indicating that SMS text messages may not be received. Each contact button 11 displays the name and, optionally, an avatar image of a contact from the user's contact list.

Clicking on the contact locator button 11A causes the application to close the homepage 10 and display the contact locator page on the visual display 14 of the electronic device 13. The user may send, review, approve, and reject all contact locators on the contact locator page. If accepted, a contact locator populates the contact lists of the user who sent it and the user who accepted it. The information included in a contact locator preferably includes a cellular telephone number and an e-mail address.

When preparing to communicate with someone on the contact list, the user presses the contact button 11 displaying the name of the contact. Pressing the contact button 11 for three seconds, or clicking on the contact button 11 and then immediately clicking on the contact locator button 11A, causes a query to be sent to the contact's electronic device 13, which in turn transmits a GPS query to acquire location information and sends it to the user's mobile electronic device 13. If no location information is received by the user's mobile electronic device 13 within a pre-determined time period, such as 20 seconds, the homepage 10 displays a "No Response" message. Further, the application may determine the speed of travel to determine whether the contact is in a vehicle.

The application uses the location information, once it has been acquired, to determine the type of location occupied by the contact, by searching for the location information on informational websites such as MAPQUEST™ or GOOGLE MAPS™. The application then displays an icon corresponding to the type of location, such as a school, a library, or a restaurant. If the contact prefers location privacy, the contact may elect to temporarily deactivate the application.

If the application cannot determine the type of location occupied by the contact, the homepage 10 displays an "Undetermined Location" message below the scrolling buttons 12. Alternately, non-specific descriptive terms for the location which may have been acquired from a website, such as "Souvenir Store," may be displayed below the scrolling buttons 12 as a message by the application even though they do not fit into a type that is represented by an icon.

The user may then select a communication method which is appropriate for the type of location. If the location is a street or highway, the icon displayed may be a steering wheel and dashboard, indicating that the contact may be driving and unavailable for SMS text messages. However, if the user is aware that the contact has a BLUETOOTH™ device or other hands-free cellphone device, the user may safely place a telephone call to the contact. If no such device is in use, the user may elect to send an e-mail to the contact for later reading, or simply attempt to communicate with the contact later in the day.

Similarly, if the location information indicates that the contact is located at a restaurant, the icon displayed may show a dinner plate, silverware, and a folded napkin. The user may determine that the contact should not be disturbed while dining, and send an e-mail or SMS text rather than calling. Other icons may indicate libraries, places of worship, schools, residences, and theaters. Icons representing a broad range of locations are contemplated and may be replaced by location logos. The managing entity of each location may opt to pay a fee to have a generic icon replaced by its own official logo as a location marketing tool, such as replacement of a generic restaurant icon with a MCDONALDS® logo which appears whenever the contact is at a MCDONALDS®, or replacement of a generic shopping icon with a TARGET® logo which appears whenever the contact is at a TARGET® store.

To use the first exemplary embodiment, the user may scroll up or down through the contact buttons 11, using the scrolling buttons 12 which are provided, to find the contact button 11 displaying the name of the contact with whom the user wishes to communicate. The user may then press the selected contact button 11 for three seconds, or click on the selected contact button 11 and then click on the contact locator button 11A, causing a query to be sent to the contact's mobile electronic device 13. This query causes the contact's electronic device 13 to transmit a GPS query and send the contact's location information, once acquired, to the user's mobile electronic device.

In the event that the user receives a "No Response" message, the user may elect to try communicating with the contact later, or choose some other course of action, such as communicating with a different contact. The application may display longitude and latitude of the contact, or may indicate that contact is in an undetermined location. The community of users may develop its own protocols regarding appropriate responses to each icon, but a genuine emergency should be the subject of more urgent protocols. If location information is received, the application identifies the type of location by displaying the corresponding icon. The user may then select an appropriate communication method for the type of location and initiate communication with the contact, or choose some other course of action.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

We claim:

1. A method for determining a method of communication between mobile electronic devices, the method comprising the steps of:
   a. a user selecting a contact from a contact list on a mobile device of the user;
   b. an application on the user's mobile device sending a location query to a mobile device of the contact;
   c. a corresponding application on the contact's mobile device receiving the location query and transmitting a GPS query to acquire GPS location information of the contact's mobile device;
   d. the corresponding application receiving the GPS location information;
   e. the contact's mobile device transmitting the GPS location information to the user's mobile device;
   f. the application determining a type of location based on the GPS location information;
   g. the application displaying an icon or logo that represents the type of location; and
   h. the user selecting a method of communication to communicate with the contact, based on information received from the corresponding application.

2. The method of claim 1, wherein the application cross-references the GPS location information with informational websites to determine the type of location.

3. The method of claim 1, wherein the type of location is selected from the group consisting of a vehicle, a restaurant, a library, a place of worship, a school, a residence, and a theater.

4. The method of claim 1, further comprising the steps of:
   a. the corresponding application determining a speed of travel of the contact based on the GPS location information; and
   b. the contact's mobile device transmitting the speed of travel to the user's mobile device.

5. The method of claim 1, wherein the method of communication is selected from the group consisting of a phone call, a text message, or an email message.

6. A system for determining a method of communication between mobile electronic devices, the system comprising:
   a. a first mobile device comprising a software application;
   b. a second mobile device comprising:
      i. a software application that corresponds to the software application of the first mobile device; and
      ii. a GPS locator device; and c. a mobile network that provides GPS location information, wherein a user selects a contact from a contact list on the first mobile device, wherein the application sends a location query to the second mobile device, wherein the corresponding application receives the location query and transmits a GPS query to the mobile network to acquire GPS location information of the second mobile device, wherein the corresponding application receives the GPS location information and transmits the GPS location information to the first mobile device, wherein the application determines a type of location of the second mobile device based on the GPS location information, wherein the first mobile device displays an icon or logo that represents the type of location, and wherein the user selects a method of communication to communicate with the contact, based on information received from the corresponding application.

7. The system of claim 6, wherein the application cross-references the GPS location information with informational websites to determine the type of location.

8. The system of claim 6, wherein the type of location is selected from the group consisting of a vehicle, a restaurant, a library, a place of worship, a school, a residence, and a theater.

9. The system of claim 6, wherein the corresponding application determines a speed of travel of the contact based on the GPS location information, and wherein the second mobile device transmits the speed of travel to the first mobile device.

10. The system of claim 6, wherein the method of communication is selected from the group consisting of a phone call, a text message, or an email message.

* * * * *